Patented Aug. 8, 1950

2,518,416

UNITED STATES PATENT OFFICE 2,518,416

PREPARATION OF ACROLEINS

Newman M. Bortnick, Philadelphia, Pa., assignor to Rohm & Haas Company, Philadelphia, Pa., a corporation of Delaware No Drawing. Application April 28, 1948, Serial No. 23,849

5 Claims. (Cl. 260—601)

This invention relates to a process for preparing aldehydes of the formula

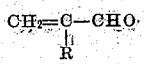

wherein R is hydrogen or a hydrocarbon group. With greater particularity it deals with the process wherein aldehydes of this formula are prepared by passing an aldehyde, $RCH_2CHO$, together with formaldehyde through a molten salt of a primary or secondary saturated monoamine.

The amine salts serve as catalysts. Suitable amines for use in this reaction are those which have at least one hydrogen on the amino nitrogen. They include methylamine, dimethylamine, ethylamine, diethylamine, butylamine, dibutylamine, amylamine, diamylamine, cyclohexylamine, dicyclohexylamine, piperidine, pyrrolidine, morpholine and the like. Non-tertiary amines which are saturated and which have not over eight carbon atoms in a single group are preferred. Mixtures of amines are useful as the salt mixtures formed therefrom have lower melting points than a single salt.

To form the salts, there are used strong, non-oxidizing acids, such as hydrochloric acid, hydrobromic acid, sulfuric acid, p-toluene sulfonic acid, benzene sulfonic acid, and the like. The acid should be at least as strong as trichloroacetic acid.

As a starting material, there is used an aldehyde having a —$CH_2$— group in the alpha position relative to the aldehydo group. Thus, in $RCH_2CHO$ the group R may be hydrogen, methyl, ethyl, propyl, isopropyl, butyl, hexyl, or other alkyl group, or a cycle-containing group such as phenyl or cyclohexyl or benzyl. It is preferred that R contain no more than eight carbon atoms.

Formaldehyde may be passed as a gas into one of the above aldehydes or be mixed therewith in the form of its aqueous solutions. The mixing of aqueous formaldehyde and other aldehyde may be assisted by use of an emulsifying agent, such as octylphenoxyethyl sodium sulfonate. The mixture is contacted with the amine salt by passing it slowly through a bed of the molten amine salt at a temperature between 120° C. and 300° C., preferably 140° C. and 220° C.

The molten amine may be extended on an inert packing in a tube or column so that an extended surface of molten amine salt can come in contact with the mixture of formaldehyde and the other reacting aldehyde. The reaction products are taken off continuously or from time to time under normal or reduced pressure. The unsaturated aldehyde formed may be washed with water and distilled or purified by other conventional methods.

The following examples are presented as typical of the process of this invention.

Example 1

A 12 inch column about 2.5 in. O. D. was welded to the bottom of a flask having a neck from which a side arm extended. A downward condenser was connected to the side arm. The column was packed with 0.375 inch clay rings and connected at its base to a supply of reactants. Catalyst was prepared by passing gaseous dimethylamine into concentrated hydrochloric acid until the mixture was about neutral. Seven moles of the catalyst was placed in the flask and column and heated to 200°–220° C. A mixture of Formalin solution and n-butyraldehyde in a proportion of 1.1 moles of the former to one mole of the latter was prepared and a trace of diisobutylphenoxy-(ethoxy)$_3$ ethyl sodium sulfonate added thereto to form an emulsion, which, although not stable, was effective for purposes of carrying the mixture into the bottom of the column. A slow stream of nitrogen was forced in at the base of the column to prevent surging. The mixture of formaldehye and butyraldehyde was slowly run in and reacted. The products were taken off through the condenser, washed, separated, and redistilled. There was thus obtained alpha-ethyl acrolein in a conversion of 51% on the basis of the butyraldehyde run into the reactor.

Example 2

The general procedure and the apparatus of Example 1 were applied to the preparation of alpha-methylacrolein. The catalyst was prepared by running monomethylamine into concentrated hydrochloric acid, which catalyst was placed in the flask and column and heated to 140° C. A mixture of propionaldehyde and formaldehyde was prepared in the ratio of one mole of the former to 1.2 moles of the latter. This mixture was slowly forced into the base of the column at the rate of one-third mole of propionaldehyde per hour. The reaction temperature was maintained between 140° C. and 160° C. The vapors taken off were condensed. Therefrom was separated by distillation a fraction boiling at 64° C. This was dried over sodium sulfate and redistilled at 68°–69° C. The product corresponded in composition to alpha-methyl acrolein.

Example 3

The above procedures were followed in general with a mixture of equimolecular proportions of a 36.5% formaldehyde solution and phenylacetaldehyde. This mixture was injected into the apparatus containing dimethylamine hydrochloride as a catalyst to which was added three per cent. by weight of di-beta-naphthol. The flask and column containing the catalyst were heated to 200° C. and the pressure was reduced to 50 mm. to 75 mm. while the reaction mixture was slowly added. From the reaction products there was separated a fraction boiling at 96° C. at 12 mm. which corresponds in composition to alpha-phenyl acrolein, a substance which tends to polymerize rather readily.

In place of the above aldehydes there may be used others which have the structure RCH$_2$CHO, including acetaldehyde. The process of this invention is particularly applicable to aliphatic aldehydes of this type in which R contains one to seven carbon atoms.

The unsaturated aldehydes obtained are useful as chemical intermediates. For example, they may be oxidized to the corresponding acids and esters formed therefrom. The unsaturated aldehydes and many of their derivatives give interesting polymers or copolymers.

I claim:

1. A process for preparing unsaturated aldehydes of the formula

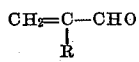

wherein R is an alkyl group of one to seven carbon atoms which comprises reacting by passing a mixture of an aldehyde, RCH$_2$CHO, and formaldehyde into the molten salt of a strong acid and of a saturated non-tertiary amine at 120° C. to 300° C. and continually taking off the vapor of a said unsaturated aldehyde.

2. The process of claim 1 wherein the amine is a secondary amine.

3. The process of claim 2 wherein the secondary amine is dimethylamine.

4. A process for preparing alpha-ethyl acrolein which comprises reacting by passing a mixture of butyraldehyde and formaldehyde into the molten salt of a strong acid and of a saturated non-tertiary amine at 120° C. to 300° C. and continually taking off the vapor of alpha-ethyl acrolein.

5. A process for preparing alpha-methyl acrolein which comprises reacting by passing a mixture of propionaldehyde and formaldehyde into the molten salt of a strong acid and of a saturated non-tertiary amine at 120° C. to 300° C. and continually taking off the vapor of alpha-methyl acrolein.

NEWMAN M. BORTNICK.

REFERENCES CITED

The following references are of record in the file of this patent:

Mannich et al.: Berichte, 65, 378 to 385 (1932).